J. RADDIN.
Carriage Wheel.
No. 72,538.
Patented Dec. 24, 1867.
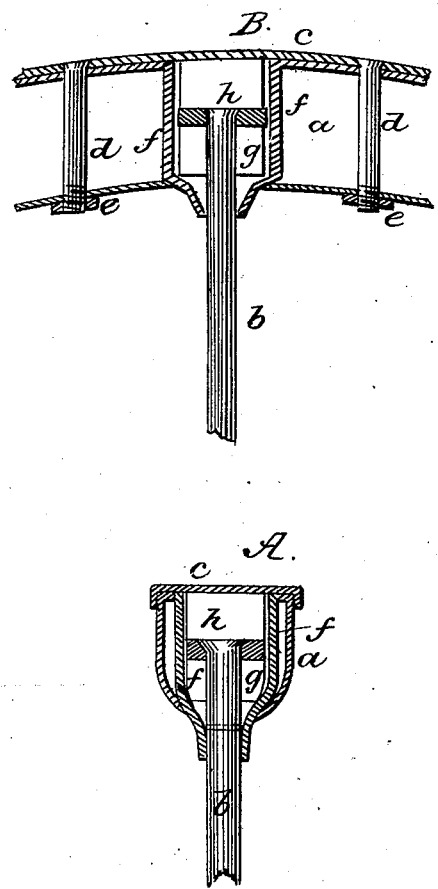
Witnesses
M. W. Frothingham
S. B. Kidder
Inventor
John Raddin
by his Attys
Crosby & Gould

United States Patent Office.

JOHN RADDIN, OF LYNN, MASSACHUSETTS.

Letters Patent No. 72,538, dated December 24, 1867; antedated December 10, 1867.

IMPROVEMENT IN CARRIAGE-WHEELS.

*The Schedule referred to in these Letters Patent and making part of the same.*

TO ALL WHOM IT MAY CONCERN:

Be it known that I, JOHN RADDIN, of Lynn, in the county of Essex, and State of Massachusetts, have invented an Improvement in Carriage-Wheels; and I do hereby declare that the following, taken in connection with the drawings which accompany and form part of this specification, is a description of my invention sufficient to enable those skilled in the art to practise it.

The invention relates to that class of carriage-wheels each having a metal felloe or felloes; and consists in constructing such wheels with felloes made of wrought-metal tubes, the outer surfaces of which are flattened to form the tread of the wheel, or the surface to which a tread or tire may be applied.

The invention is particularly applicable to carriage-wheels in which rubber or elastic cushions are used in connection with the spokes and rim of the wheel, (as seen in my patent of June 13, 1865,) the tubular felloe forming a convenient and desirable receptacle for containing the heads of the spokes, and the elastic cushions applied thereto, with the cylinders or boxes in which the heads of the spokes and the cushions play.

The drawings represent, at A and B, respectively, a cross-section and a longitudinal section of a portion of a wheel-felloe or rim embodying the invention, the sections being taken centrally through the felloe-end of one of the spokes.

$a$ denotes the felloe or rim, $b$ one of the spokes. The felloe is tubular, as shown, being made from a wrought-metal tube or pipe, compressed at the sides, if desirable, and flattened at the outer surface. This outer surface may constitute the tread of the wheel, as before stated, but generally I prefer to apply thereto a steel tire, $c$, secured to the felloe by bolts $d$ and nuts $e$. Where the elastic cushions are used in connection with such felloe, the arrangement preferred is as follows: The outer end of each spoke works through the inner end of a box or cylinder, $f$, at the bottom of which box is a rubber block or cushion, $g$, placed under the head of the spoke, or under a washer applied thereto. Over the head another cushion, $h$, is shown, and both may be used, or either one, as may be deemed desirable, the strain coming upon the rubber as the rim expands or contracts radially, the same as shown in my aforesaid patent, and in modifications thereof made by me. Where the tire $c$ is used, the boxes or cylinders $f$ may be entered through the upper surface of the felloe, and the lower end of each be contracted, and extended through a hole bored through the inner side of the felloe, as seen in the drawing, such arrangement enabling the cylinders to be applied with facility, and in such manner as to secure each in position, as will be readily understood. For the construction of the felloe for wheels of light vehicles, I recommend the employment of wrought-iron gas-pipe.

I claim, in the construction of carriage-wheels, making the felloe or rim thereof of wrought-metal tube, the outer surface of which is flattened and surfaced by a tire, substantially as and for the purposes set forth.

Also, in combination with such tubular felloe, the elastic cushions, arranged to operate substantially as described.

JOHN RADDIN.

Witnesses:
J. B. CROSBY,
F. GOULD.